United States Patent [19]

McCombs

[11] Patent Number: 5,237,888

[45] Date of Patent: Aug. 24, 1993

[54] APPARATUS FOR REMOTE MOTION CONTROL

[75] Inventor: John C. McCombs, Montezuma, Iowa

[73] Assignee: Vermeer Manufacturing Company, Pella, Iowa

[21] Appl. No.: 872,785

[22] Filed: Apr. 22, 1992

[51] Int. Cl.⁵ .................................... B60K 23/00
[52] U.S. Cl. ............................. 74/491; 192/96
[58] Field of Search ..................... 74/491, 473 P; 192/0.084, 66, 99 A, 96

[56] References Cited

FOREIGN PATENT DOCUMENTS 1532342 12/1989 U.S.S.R. ........................ 74/473 P

*Primary Examiner*—Allan D. Herrmann
*Assistant Examiner*—William O. Trousdell
*Attorney, Agent, or Firm*—Kent A. Herink; Brian J. Laurenzo

[57] ABSTRACT

Apparatus for controlling from a remote operator station a drive means of a ground-traveling machine. A handle accessible to an operator seated at the remote operator station is moveable in a substantially T-shaped pattern. Movement of the operator handle in a line of travel defined by the stem section of the T-shaped pattern engages a clutch mechanism which connects the operator handle to a linkage arm for operating a main motion control apparatus of the drive system located at a main operator station of the machine. Upon release of the operator handle, springs bias the return of the operator handle to the home position and disengagement of the clutch mechanism. In the home position, the remote control apparatus does not interfere with operation of the main motion control apparatus from the main operator station. A safety interlock system prevents operation of the drive system of the machine at other than low speeds.

14 Claims, 4 Drawing Sheets

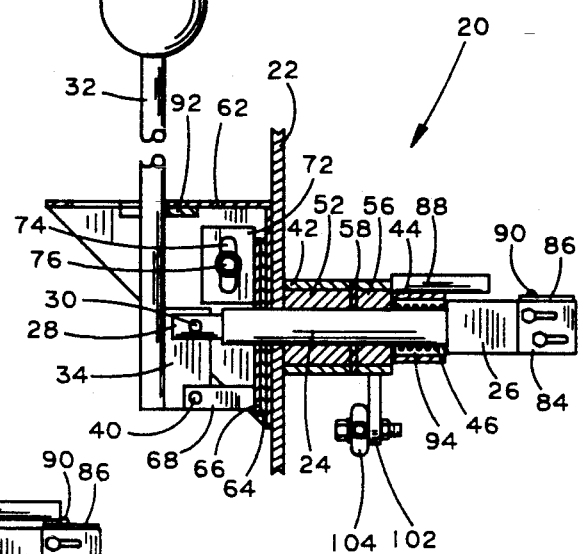
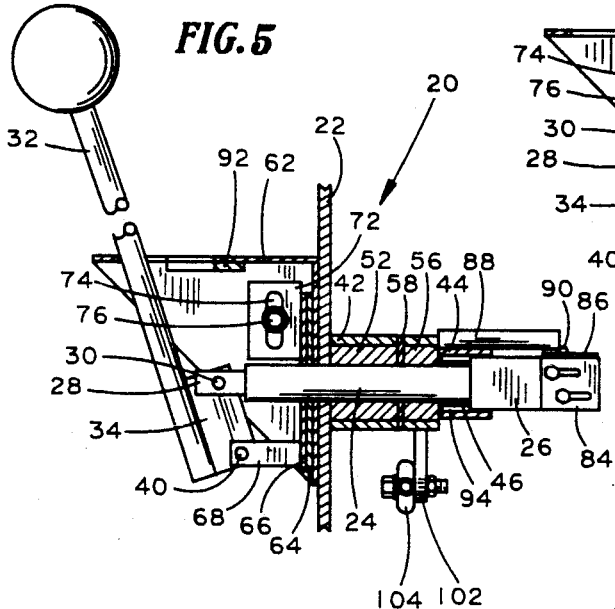
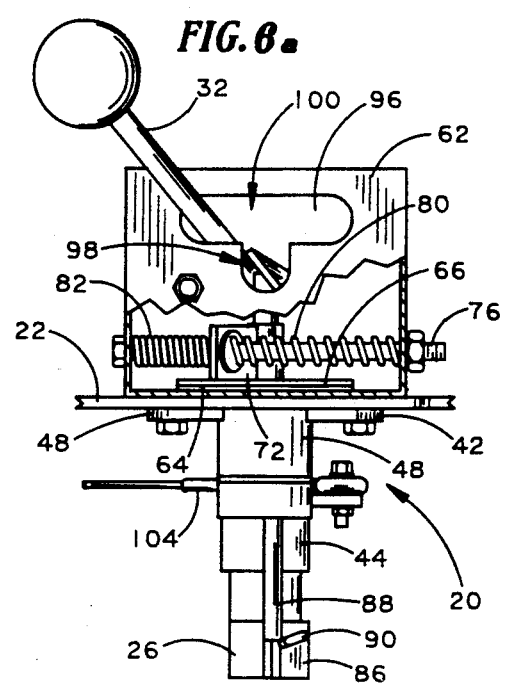
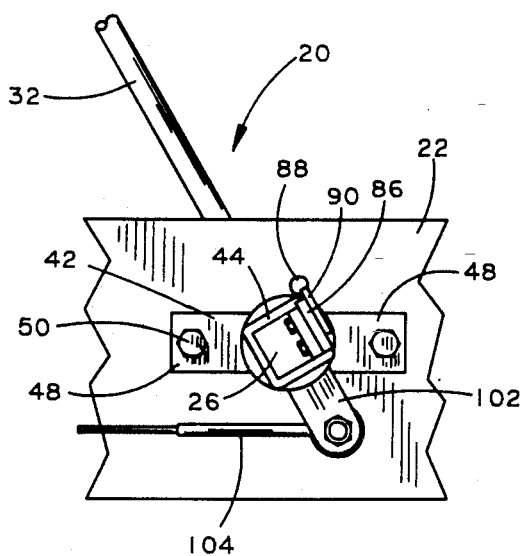

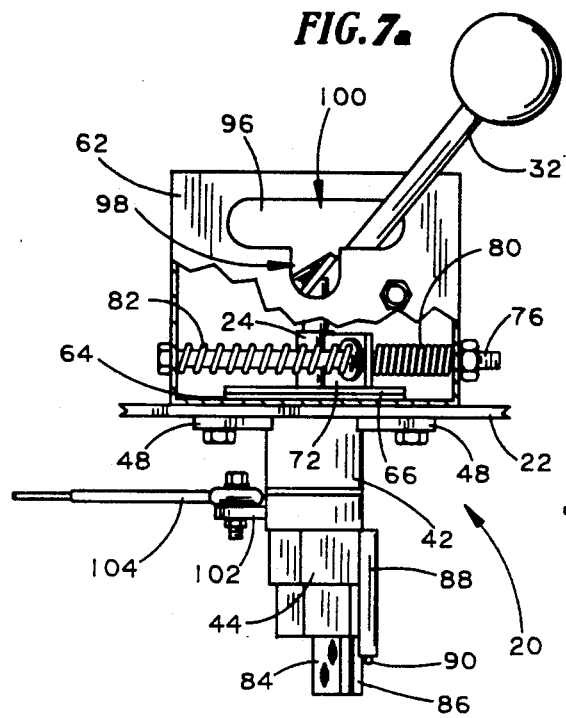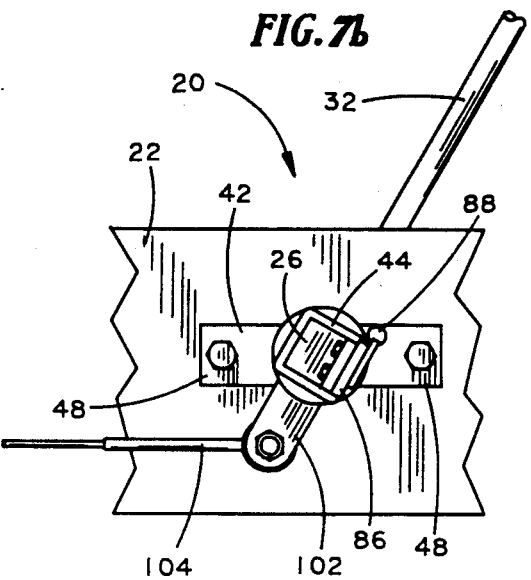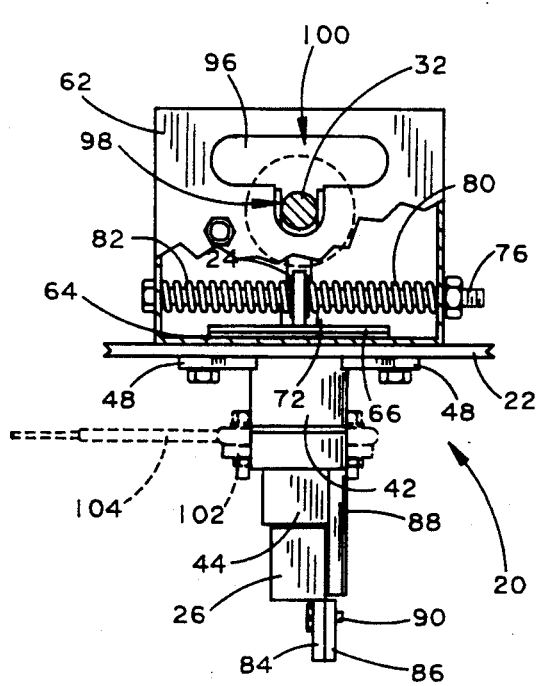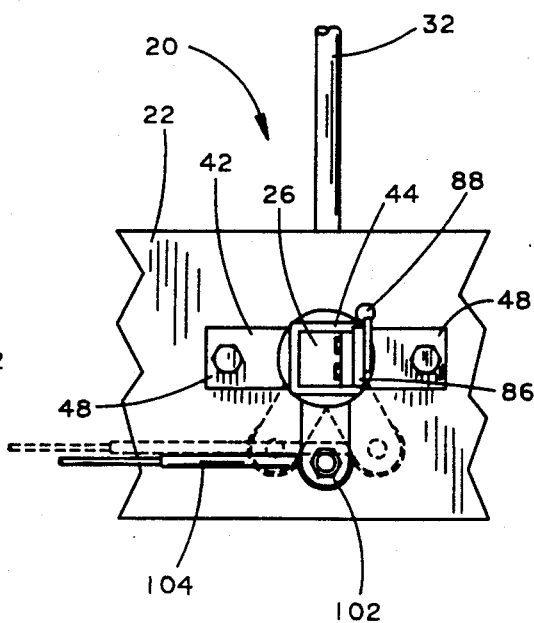

APPARATUS FOR REMOTE MOTION CONTROL

BACKGROUND OF THE INVENTION

The invention relates generally to motion control systems and, more particularly, to an apparatus located at a remote operator's station which allows an operator of a machine to control the motion of the machine from the remote control location.

A wide variety of machines and equipment have both a main operator's control station and a remote control station for controlling the operation of various aspects of the equipment. A typical example of such a machine is a combination trencher and backhoe machine wherein a rearwardly extended trenching bar and a forwardly extended backhoe arm are attached to opposite end portions of a tractor unit. The tractor unit includes a main operator station from which motion of the tractor unit is primarily controlled. A remote operator station is provided at the forward end of the tractor unit adjacent to the backhoe arm for the control of same. If while the operator is in the remote operator station using the backhoe arm and movement of the tractor unit is desired, it is necessary for the operator to dismount from the remote operator station and return to the main operator station to move the machine. Not only is this an inconvenience, but accurate movement of the machine from the main operator's control station may be difficult due to the poor vantage point and possibly obscuring portions of the tractor unit.

There is a need, accordingly, for a way of controlling the motion of the machine from the convenient and preferred vantage point of the remote operator station. Moreover, while the equipment may be capable of high, over-the-road transport speeds, the system for controlling motion from the remote operator station should safeguard against operation of the motion controls beyond a limited, low-range.

SUMMARY OF THE INVENTION

The invention consists of apparatus for motion control of mobile equipment from a remote operator station. An operator handle is located adjacent the remote operator station for movement by an operator into and out of a home position. Pivotal movement of the operator handle out of the home position into a neutral position engages a mating coupling so that subsequent pivotal movement of the operator handle away from the neutral position will result in engagement and corresponding movement of a drive system of the equipment. In the home position of the operator handle, the remote control apparatus is effectively disengaged from the drive system of the equipment. The operator handle is spring-biased to the neutral and to the home position so that upon release by an operator it will return to its disengaged home position. Electrical control apparatus associated with the operator handle and the drive system of the equipment prevent use of the remote motion control apparatus to move the equipment when it is in other than the lowest ground speed range of the equipment.

An object of the present invention is to provide a remote motion control apparatus which permits manual control of the motion of equipment from a remote operator station.

Another object of the invention is to provide a remote control apparatus which does not interfere with the motion control of the equipment from a main operator station.

A further object of the invention is to provide a remote motion control apparatus which is rendered inoperative except when the equipment is in the lowest range of ground speed.

These and further objects of the invention will be made apparent upon a review of the following specification, attached drawings, and claims.

BRIEF DESCRIPTION OF THE DRAWINGS

FIG. 4 is a cross-sectional view of the apparatus of FIG. 2 showing the operator handle in the home position therefor.

FIG. 5 is a cross-sectional view corresponding to FIG. 4 wherein the operator handle has been pivoted away from the home position therefor.

FIG. 6a is an upper plan view of the apparatus of FIG. 2 wherein the operator handle has been pivoted away from the home position and rearwardly to a "reverse" position therefor, and FIG. 6b is a detailed end view corresponding to FIG. 6a.

FIGS. 7a and 7b correspond to FIGS. 6a and 6b wherein the operator handle has been moved to a "forward" position therefor.

FIGS. 8a and 8b are a plan view and end view, respectively, of the apparatus of FIG. 2 illustrating movement of a linkage arm by manipulation of controls at a main operator station and the resulting movement of portions of the disengaged remote motion control apparatus.

DETAILED DESCRIPTION OF A PREFERRED EMBODIMENT

Figure 1:
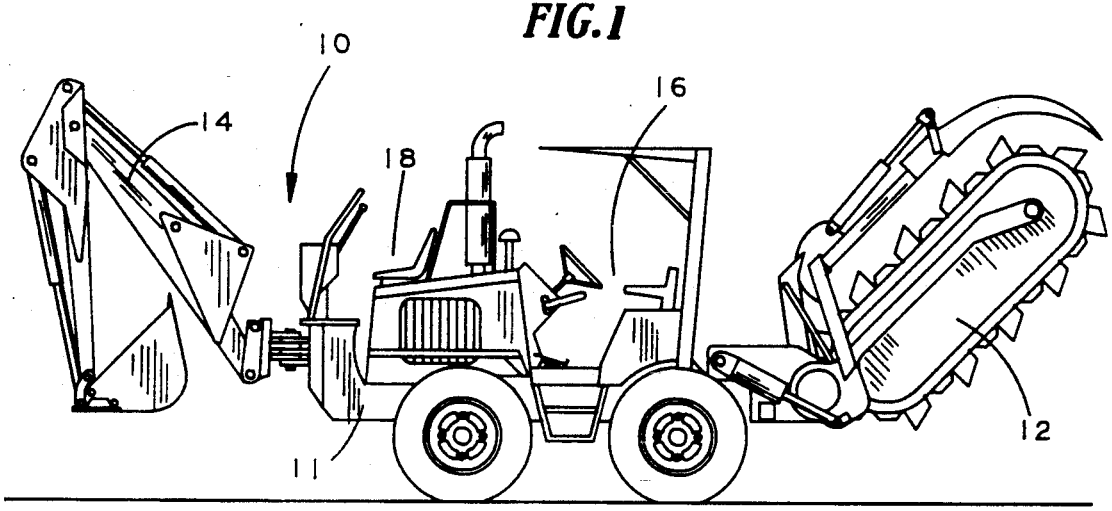
FIG. 1 is a side view of a ground-traveling machine having a main operator station, a remote operator station, and including the present invention.
Figure 2:
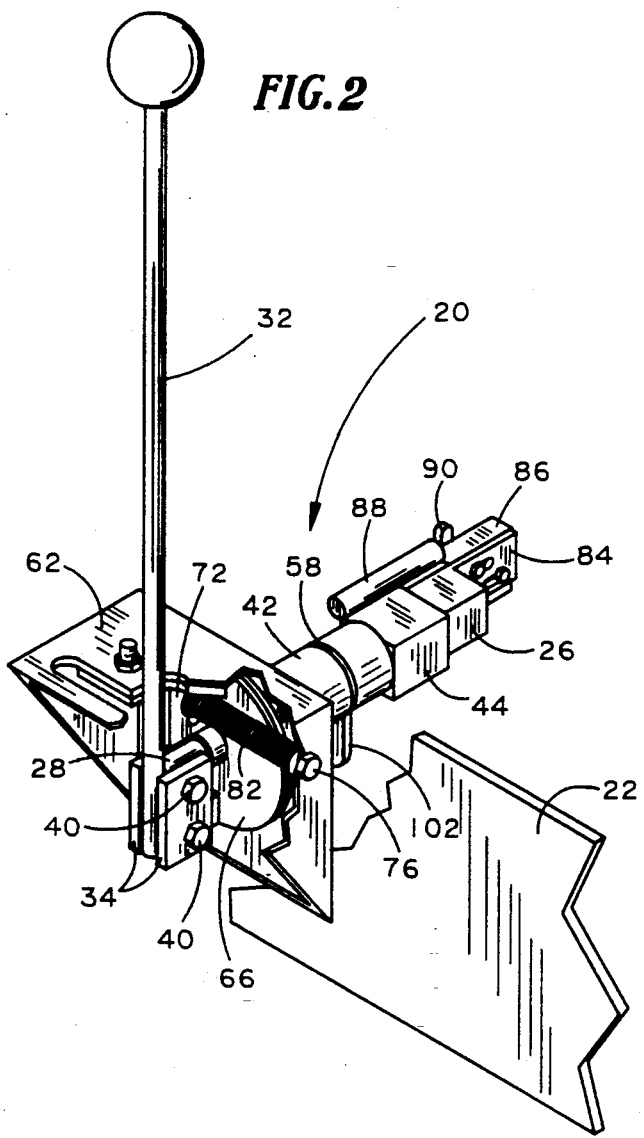
FIG. 2 is a detailed perspective view of an operator handle and control apparatus of the present invention with parts broken away for clarity.

Illustrated in FIG. 1, generally at 10, is a ground-traveling machine which includes a tractor unit 11, a rear-mounted trenching bar 12 and a forwardly mounted backhoe 14. The tractor 10 has a main operator station at 16 and a remote operator station at 18. The machine 10 also includes a drive system, which in the preferred embodiment, is a hydraulic drive system including a hydraulic pump driven by the main drive engine of the machine 10. The hydraulic drive system is operable over two speed ranges in each of two ground drive modes. A ground drive mode control lever (not shown) is associated with the main operator station 16 and is operable to put the machine 10 in either a transport mode or a creep mode. In each of such modes, a drive range control lever (not shown), also associated with the main operator station 16, is adjustable to operate the hydraulic drive system over two speed ranges, a first, high speed range and a second, low speed range. The machine 10 may be operated in the creep mode and over the range of speeds available when the ground drive range control lever is in the low range from either the main operator station 16 or the remote operator station 18. In the high speed range or when the ground drive mode control lever is in the transport position, the machine 10 can only be operated from the main operator station 16. The creep mode is generally used for ground travel of the machine 10 when the trenching bar 12 is also being operated and will "creep" the machine 10 to advance the trenching bar 12 at an appropriate, low speed for efficient trenching.

Figure 3:
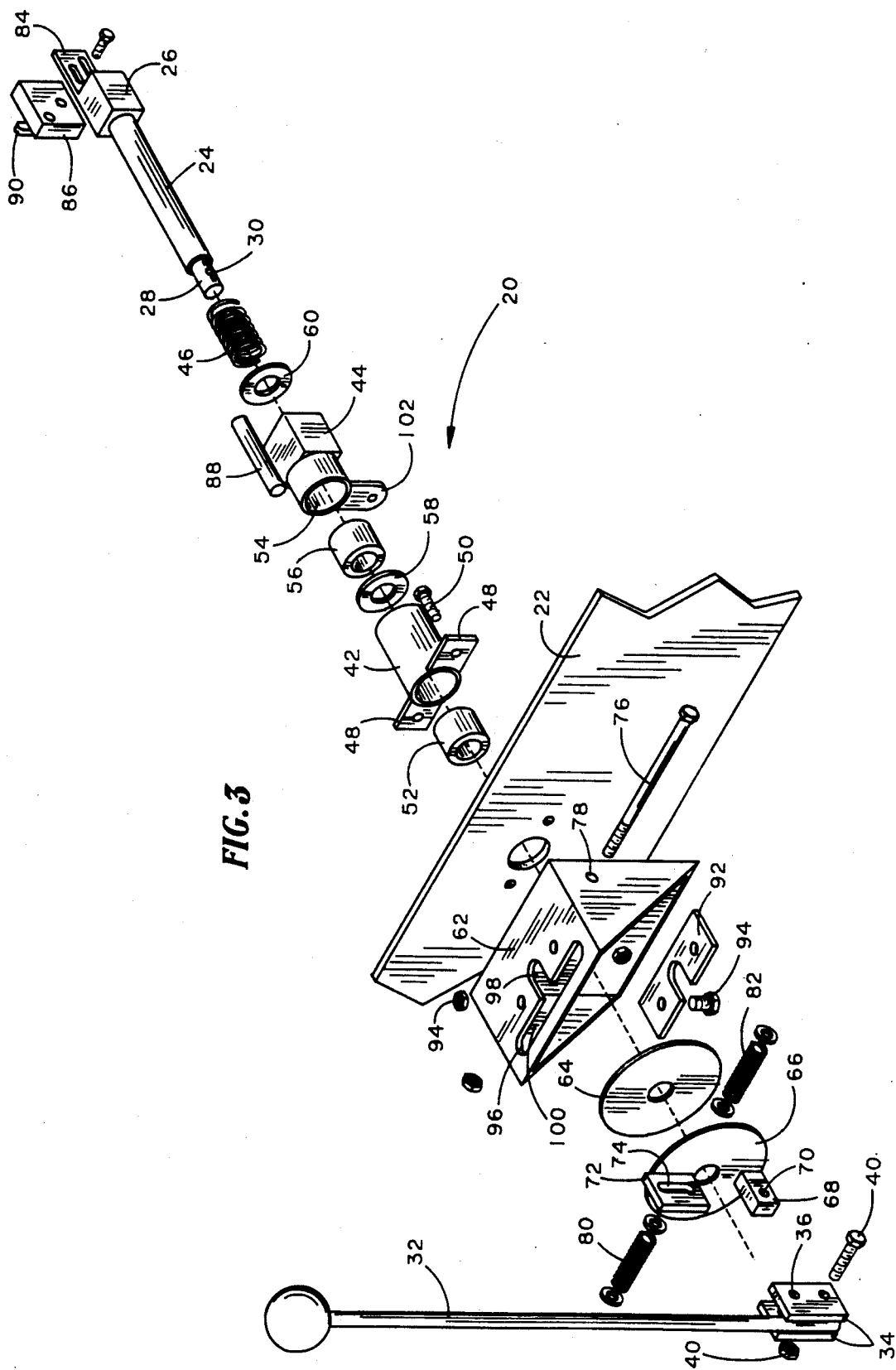
FIG. 3 is an exploded perspective view of the apparatus illustrated in FIG. 2.

A remote motion control apparatus of the present invention is illustrated in FIGS. 2-8 generally at 20. Referring to FIG. 3, the apparatus 20 is mounted on a supporting section 22 of the machine 10 in operating proximity to the remote operator station 18 (FIG. 1). The apparatus 20 includes an actuator rod 24 which has an enlarged male end portion 26 of a substantially square cross-section. The actuator rod 24 also includes an opposite end portion 28 of a reduced diameter and which has a transverse throughbore 30.

The actuator rod 24 is mounted for pivotal and axial movement relative to the longitudinal axis thereof by an operator handle 32. A pair of attachment ears 34 are located on the lower end portion of the operator handle 32. Each of the attachment ears 34 has a pair of axially aligned throughbores 36 and 38. The operator handle 32 is attached to the actuator rod 24 by insertion of the reduced diameter end portion 28 between the attachment ears 34 and aligning the throughbore 30 of the axial rod 24 with the upper throughbores 36 of the attachment ears 34. A nut and bolt combination 40 is inserted through the aligned throughbores to releasably and pivotally secure the actuator rod 24 to the operator handle 32.

The axial rod 24 is received inside a plurality of components including a cylindrical mount 42, a female lever block 44, and a compression spring 46. The cylindrical mount 42 includes a pair of radially extended mounting ears 48 by which the cylindrical mount 42 is releasably attached to the frame section 22 by way of corresponding openings in the mounting ears 48 and the frame section 22 and a pair of nut and bolt combinations, one of which is illustrated at 50. The cylindrical mount 42 includes an interior bearing 52 of a size to substantially fill the annular gap between the outer diameter of the axial rod 24 and the inner diameter of the cylindrical mount 42.

The female lever block 44 has a cylindrical throughbore 54 which receives a bearing 56 which is, in turn, received about the axial rod 24. Again, the bearing 56 is of a size to substantially fill the annular gap between the outer diameter of the axial rod 24 and the inner diameter of the throughbore 54 of the female lever block 44. A washer 58 is received about the axial rod 24 and is interposed between the cylindrical mount 42 and the female lever block 44 to facilitate relative pivotal movement therebetween. In a similar manner, a washer 60 is received about the actuator rod 24 and is held between the end surface of the female lever block 44 and the compression spring 46.

The actuator rod 24 includes an outwardly extended mounting section 84 for the mounting of microswitch 86. During operation of the apparatus 20, as will be described in more detail below, an actuating finger 88 on the female lever block 44 will contact and move a button 90 of the microswitch 86 thereby changing its state.

A lever guide 62 is mounted on the frame section 22 opposite of the cylindrical mount 42 and releasably secured by the nut and bolt combinations 50. A stiffener 92 is attached by way of nut and bolt combinations, one of which is illustrated at 94, to the underside of the top portion of the lever guide 62. A friction disk 64 and outside pivot lever 66 are received about the actuator rod 24 and interposed between the operator handle 32 and the lever guide 62. The outside pivot lever 66 includes a lower, outwardly extending mounting ear 68 that has a throughbore 70 which, when the mounting ear 68 is inserted between the mounting ears 34 of the operator handle 32, is brought into axial alignment with the throughbores 38 and releasably secured to the operator handle 32 by a second pair of the nut and bolt combination 40. Also forming a part of the outside pivot lever 66 is an outwardly extended lever member 72 oriented on a radial line diametrically opposite to the mounting block 68. The lever member 72 has an elongated throughbore or slot 74. In assembly, a bolt 76 passes through a pair of aligned openings, one of which is illustrated at 78, in the opposite side walls of the lever guide 62. The bolt 76 also passes through the elongated slot 74 of the lever member 72 of the outside pivot lever 66. Trapped on either side of the lever member 72 and inside the opposite side walls of the lever guide 62, and received about the bolt 76, are a pair of spring and washer combinations 80 and 82. As will be described in more detail below, the springs 80 and 82 act to center the outside pivot lever 66 relative to the lever guide 62.

The apparatus 20 is shown in assembly in FIGS. 4-8. The female lever block 44 has a first end portion which is cylindrical and a second end portion which is substantially square-shaped. The square-shaped second end portion, as best illustrated in FIGS. 4 and 5, has a square-shaped pocket 94 of a size to receive the enlarged male end portion 26 of the actuator rod 24. The actuator rod 24 and the female lever block 44 thus form a clutch mechanism which is in a disengaged condition when the male end portion 26 of the actuator rod is outside of the pocket 94 of the female lever block 44 (FIG. 4). Upon pivotal movement of the operator handle 32 away from the female lever block 44 about the pivot point at 40, the actuator rod 24 will be moved so as to draw the male end portion 26 thereof into the square pocket 94 of the female lever block 44 (FIG. 5). Note that the compression spring 46 acts to bias the actuator rod 24 and therefore the operator handle 32 to the disengaged position of FIG. 4. Note also that movement of the male end portion 26 of the actuator rod 24 inside the female lever block 44 will result in the actuating finger 88 contacting and moving the button 90 of the microswitch 86 (FIG. 5).

The operator handle 32 is constrained to move in a substantially T-shaped path by the T-shaped opening 96 of the lever guide 62 (FIGS. 3, 6a, 7a, and 8a) which is comprised of a stem section 98 and an arm section 100. When the male end portion 26 of the actuator rod 24 is disengaged from the female lever block 44, the operator handle 32 will be located in a home position adjacent the outer or free end portion of the stem section 98 of the T-shaped opening 96 (FIG. 8a). The stem section 98 acts to constrain the motion of the handle 32 away from the home position in a line of travel aligned with the longitudinal axis of the actuator rod 24. Along this line of travel, the male end portion 26 of the actuator rod 24 is in alignment with the square pocket 94 of the female lever block 44 such that it can be drawn inside thereof and so engage the two-piece clutch mechanism.

Upon movement of the operator handle 32 away from the home position and to a central, neutral location on the arm section 100 of the T-shaped opening 96, the operator handle 32 is moveable along a line of travel defined by the arm section 100. Movement of the operator handle 32 along the line of travel defined by the arm section 100 will result in pivotal movement of the handle member 32 about the longitudinal axis of the actuator rod 24. The operator handle 32 will thus act to pivot the outside pivot lever 66 (FIGS. 6a and 7a). This pivotal motion will result in travel of the outwardly extended lever member 72 along the bolt 76 in coordination with the movement of the operator handle 32.

Movement of the operator handle 32 in a first or "reverse" direction along the line of travel defined by the arm section 100 will result in compression of the spring 82 (FIG. 6a), and movement of the operator handle 32 in the opposite or "forward" direction will result in compression of the spring 80 (FIG. 7a). Because the operator handle has been pivoted away from the home position during its travel along the arm section 100, the two-piece clutch mechanism is engaged and pivotal motion of the actuator rod 24 by the handle member 32 will result in corresponding pivotal motion of the female lever block 44. As best illustrated in FIGS. 6b, 7b, and 8b, the female lever block 44 includes a downwardly extending lever arm 102 that is pivoted in response to pivotal motion of the female lever block 44. A linkage arm 104 is pivotally attached to the outer end portion of the lever arm 102 and extends to a control mechanism of the drive system of the machine 10 located at the main operator station 16. Accordingly, pivotal movement of the operator handle 32 in the arm section 100 to the "reverse" position illustrated in FIGS. 6a and 6b, will pull on the linkage arm 104 whereas movement to the "forward" position illustrated in FIGS. 7a and 7b will push on the linkage rod 104.

When the operator handle 32, however, is in the home position therefor (FIG. 8a), the male end portion 26 of the actuator rod 24 is disengaged from the female lever block 44. If the linkage arm 104 is then pushed or pulled by a motion control apparatus for the drive system at the main operator station 16, the resulting motion will pivot the lever arm 102 and associated female lever block 44 about the cylindrical main body section of the actuator rod 24 (FIG. 8b). Because the actuator rod 24 is disengaged from the female lever block 44, this pivotal motion of the female lever block 44 is unrestrained. Accordingly, when the operator handle 32 is in the home position therefor, the remote motion control apparatus 20 does not interfere with normal operation of the motion control apparatus located at the main operator station 16.

The drive system of the machine 10, as described above, has two speed ranges that are operable over both the creep mode and the transport mode of the drive system. The actuator switch 86 forms a part of an electrical control circuit which also includes microswitches (not shown) associated with the mode control and speed range levers of the drive system. The switches are arranged so that movement of the operator handle 32 away from the home position therefor (which results in a change in state of the microswitch 86 by the actuating finger 88) will operate a solenoid to turn off the engine of the machine 10 unless the microswitches associated with the mode and speed range levers indicate that the mode lever is in the "creep" mode and the speed range lever is in the "low" speed range. This safety interlock feature prevents operation of the drive system of the machine 10 from the remote operator station 18 except when the machine is in the creep mode and the low speed range.

Although the invention has been described with respect to a preferred embodiment thereof, it is to be also understood that it is not to be so limited since changes and modifications can be made therein which are within the full intended scope of this invention as defined by the appended claims.

I claim:

1. Apparatus for controlling from a remote operator station a drive means of a ground-traveling machine, comprising:
   (a) handle means accessible from the remote operator station and moveable in a first and a second line of travel;
   (b) clutch means moveable from a disengaged to an engaged condition upon movement of said handle means in said first line of travel away from a home position therefor; and
   (c) means linking said clutch means to the drive means for operation of the drive means upon movement of said clutch means in said engaged condition by movement of said handle means in said second line of travel.

2. Apparatus as defined in claim 1, further comprising means for biasing said handle means along said first line of travel toward said home position.

3. Apparatus as defined in claim 1, wherein said first line of travel intersects said second line of travel at a central, neutral position thereof.

4. Apparatus as defined in claim 3, further comprising means for biasing said handle means along said second line of travel toward said central, neutral position.

5. Apparatus as defined in claim 3, wherein movement of said handle means along said first line of travel from said home position to said central, neutral position moves said clutch means from said disengaged to said engaged condition.

6. Apparatus as defined in claim 3, wherein said clutch means is engaged throughout movement of said handle means along said second line of travel.

7. Apparatus as defined in claim 1, wherein said handle means is pivotally moveable about a lower end portion thereof in two vertical planes that are substantially perpendicular to each other.

8. Apparatus as defined in claim 1 wherein the machine moves at a greater speed the greater the displacement of said handle along said arm section away from said central, neutral position.

9. Apparatus for controlling from a remote operator station a drive means for a ground-traveling machine, comprising:
   (a) handle means accessible from the remote operator station and moveable in a T-shaped path including an arm section and a stem section intersecting centrally of said arm section;
   (b) clutch means moveable from a disengaged to an engaged position upon movement of said handle means along the stem section of said T-shaped path toward said arm section; and
   (c) means linking said clutch means to the drive means for operation of the drive means in response to movement of said handle means along the arm section of said T-shaped path.

10. Apparatus as defined in claim 9, further comprising means for biasing said handle means toward the intersection of said arm section and said stem section and means for biasing said handle means toward an extended end portion of said stem section opposite from said arm section such that upon release of said handle portion located at any position on said T-shaped path, said handle portion will be moved to said extended end portion of said stem section.

11. Apparatus as defined in claim 9, wherein the drive means is operable by other than said handle means when said clutch means is in said disengaged position.

12. Apparatus for controlling from a remote operator station a drive means of a ground-traveling machine, comprising:
   (a) a handle accessible to an operator at the remote operator station and constrained for pivotal movement about a lower end portion thereof in a T-shaped path including an arm section and a stem section intersecting centrally of said arm section;
   (b) a clutch having an axially fixed first section and a second section that is axially moveable in response to movement of said handle along the stem section of said T-shaped path;
   (c) said second clutch section is disengaged from said first clutch section when said handle is in a home position therefor at a free end portion of said stem section and is engaged with said first clutch section upon movement of said handle away from said home position;
   (d) said second clutch section and said engaged first clutch section are pivotally moveable in response to movement of said handle along the arm section of said T-shaped path; and
   (e) means linking said first clutch section to the drive means for operation of the drive means in response to movement of said handle along said arm section of said T-shaped path.

13. Apparatus as defined in claim 12, further comprising means for returning said handle to said home position upon release of said handle by an operator.

14. Apparatus as defined in claim 12, wherein movement of said handle away from a central, neutral position in a first direction along said arm section will result in forward movement of the machine and wherein movement of said handle away from said central, neutral position in an opposite, second direction along said arm section will result in rearward movement of the machine.

* * * * *